United States Patent
Dong et al.

(10) Patent No.: US 9,619,860 B2
(45) Date of Patent: Apr. 11, 2017

(54) HYBRID ON-DEMAND GRAPHICS TRANSLATION TABLE SHADOWING

(71) Applicants: Yao Zu Dong, Shanghai (CN); Xiao Zheng, Shanghai (CN); Kun Tian, Shanghai (CN)

(72) Inventors: Yao Zu Dong, Shanghai (CN); Xiao Zheng, Shanghai (CN); Kun Tian, Shanghai (CN)

(73) Assignee: Inte Corporation, Santa Clara, CA (US)

( * ) Notice: Subject to any disclaimer, the term of this patent is extended or adjusted under 35 U.S.C. 154(b) by 0 days.

(21) Appl. No.: 14/777,738

(22) PCT Filed: Dec. 24, 2014

(86) PCT No.: PCT/CN2014/094804
§ 371 (c)(1),
(2) Date: Sep. 16, 2015

(87) PCT Pub. No.: WO2016/101172
PCT Pub. Date: Jun. 30, 2016

(65) Prior Publication Data
US 2016/0292816 A1    Oct. 6, 2016

(51) Int. Cl.
*G06F 12/1009*   (2016.01)
*G06F 9/455*      (2006.01)
(Continued)

(52) U.S. Cl.
CPC .............. *G06T 1/60* (2013.01); *G06F 9/455* (2013.01); *G06F 9/45533* (2013.01);
(Continued)

(58) Field of Classification Search
None
See application file for complete search history.

(56) References Cited

U.S. PATENT DOCUMENTS

| 7,370,324 B2 | 5/2008 | Goud et al. |
| 7,421,689 B2 | 9/2008 | Ross et al. |

(Continued)

FOREIGN PATENT DOCUMENTS

| CN | 101454883 | 7/2009 |
| KR | 10-0433499 | 5/2004 |

(Continued)

OTHER PUBLICATIONS

PCT/CN2014/094804, "Notification of Transmittal of the International Search Report and the Written Opinion of the International Searching Authority, or the Declaration" mailed Sep. 30, 2015, pp. 11.

(Continued)

*Primary Examiner* — Joni Richer
(74) *Attorney, Agent, or Firm* — Blakely, Sokoloff, Taylor & Zafman LLP

(57) ABSTRACT

In several embodiments, a graphics processor couples to a virtual machine monitor (VMM) to present a virtual graphics processor to one or more virtual machines. A mediator for the virtual graphics processor synchronously shadows modifications to a guest graphics translation table (GTT) of a virtual machine to a shadow GTT of the VMM using trap and emulate virtualization. If the mediator detects a frequency of modifications to the guest GTT that exceeds a threshold the mediator may then asynchronously shadow at least a portion of the guest GTT to the shadow GTT and rebuild the shadow GTT prior to submitting commands for the virtual graphics processor to the graphics processor.

20 Claims, 20 Drawing Sheets

(51) Int. Cl.
*G06T 1/60* (2006.01)
*G06F 12/10* (2016.01)

(52) U.S. Cl.
CPC .......... *G06F 9/45558* (2013.01); *G06F 12/10* (2013.01); *G06F 12/1009* (2013.01); *G06F 2009/45591* (2013.01); *G06F 2212/151* (2013.01)

(56) References Cited

U.S. PATENT DOCUMENTS

| | | | |
|---|---|---|---|
| 7,451,553 B2 | 11/2008 | Dun et al. | |
| 2006/0259734 A1* | 11/2006 | Sheu | G06F 12/1036 711/203 |
| 2007/0162683 A1 | 7/2007 | Hattori et al. | |
| 2008/0001958 A1* | 1/2008 | Vembu | G06F 9/4403 345/531 |
| 2008/0168479 A1 | 7/2008 | Purtell et al. | |
| 2010/0332910 A1* | 12/2010 | Ali | G06F 9/455 714/45 |
| 2011/0102443 A1* | 5/2011 | Dror | G06T 1/20 345/522 |
| 2014/0055466 A1* | 2/2014 | Petrov | G06F 9/45533 345/520 |
| 2014/0281017 A1* | 9/2014 | Apte | H04L 65/80 709/234 |

FOREIGN PATENT DOCUMENTS

| | | |
|---|---|---|
| KR | 2007/0090047 | 9/2007 |
| KR | 2009/0007494 | 1/2009 |
| KR | 2009/0026286 | 3/2009 |
| TW | 1342521 | 5/2011 |
| TW | 201245975 | 11/2012 |
| TW | 1453672 | 9/2014 |
| TW | 201445449 | 12/2014 |
| WO | WO-2013-091185 | 6/2013 |
| WO | WO-2014-058935 | 4/2014 |

OTHER PUBLICATIONS

Office Action from Counterpart KR Patent Application No. 2015-7033348, Mailed Sep. 9, 2016, 10 pages.
Notice of Allowance and Search Report for Taiwan Application No. 104138744 issued Nov. 10, 2016, 2 pages.

* cited by examiner

HYBRID ON-DEMAND GRAPHICS TRANSLATION TABLE SHADOWING

CROSS-REFERENCE TO RELATED APPLICATION

This patent application is a U.S. National Phase Application under 35 U.S.C. §371 of International Application No. PCT/CN2014/094804, filed Dec. 24, 2014, entitled HYBRID ON DEMAND GRAPHICS TRANSLATION TABLE SHADOWING, and the entire contents of which are incorporated herein by reference.

TECHNICAL FIELD

Embodiments generally relate to graphics virtualization environments. More particularly, embodiments relate to the management of graphics translation tables.

BACKGROUND

Graphics virtualization may enable software executing within a virtual machine (VM) to control various events and have access to graphics hardware resources on a physical machine, wherein a virtual machine monitor (VMM) may create and run the VMs on the physical machine. Accordingly, the VM software may collectively be referred to as guest software and the VMM may be referred to as a host. Partitioning the graphics hardware resources between multiple VMs may present certain challenges with regard to efficiency and security. For example, the host and the guest software in conventional graphics virtualization solutions may not have the same view (e.g., size and layout) of the graphics memory address space, nor can the guest graphics memory address space be identical to the system memory address space in certain instances. Accordingly, as guest commands (e.g., rendering commands) are issued by the guest software to the graphics hardware, address remapping and/or fixing (e.g., finding the guest address in the command and replacing it with a host address) from the guest view to the host view may be conducted. Hardware based address remapping and/or fixing may involve tagging technology that adds complexity. Moreover, software based address remapping and/or fixing may involve VMM interception, parsing and/or conversion of each guest command, which may cause additional overhead.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

System Overview

Figure 1:
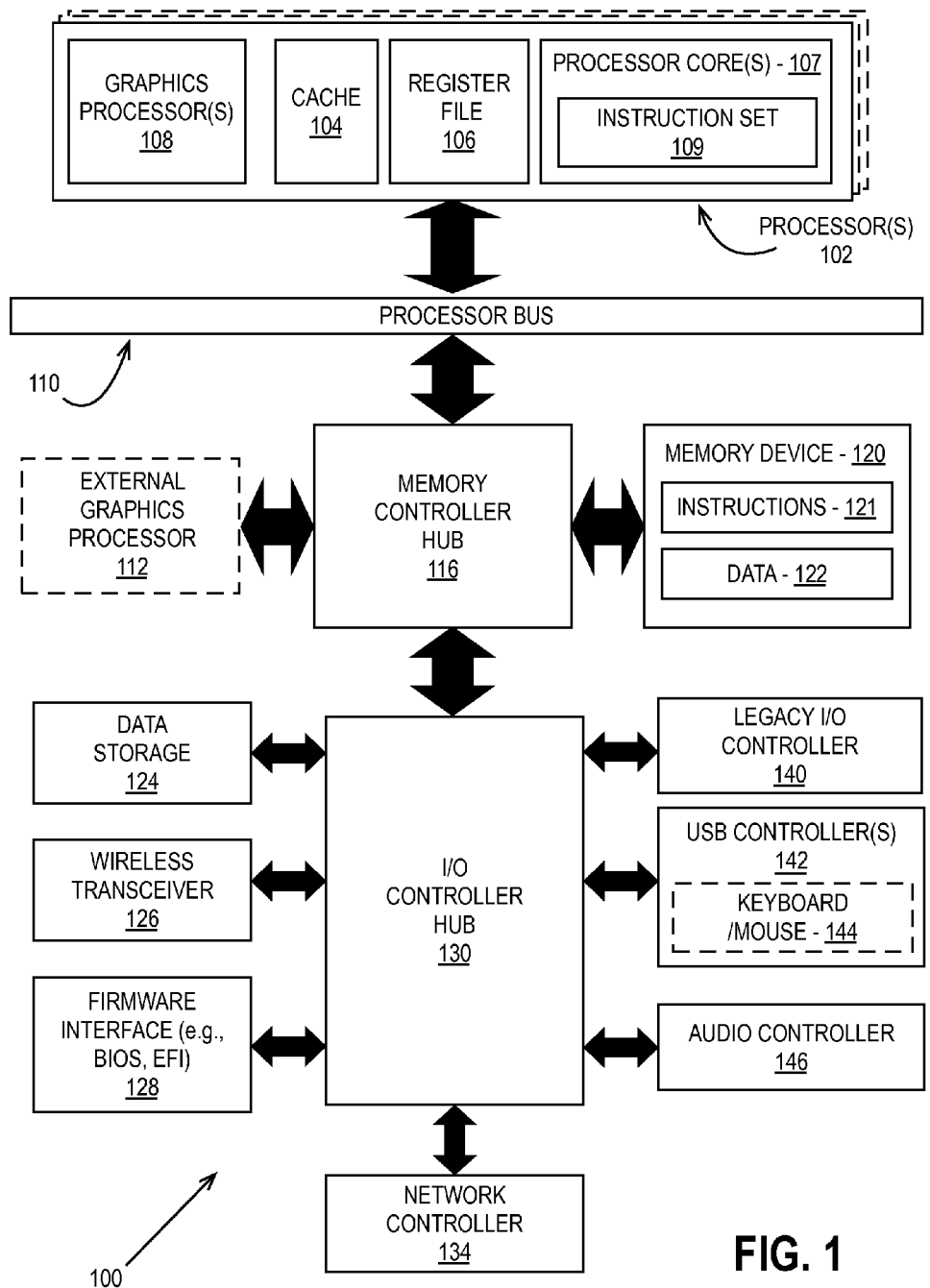
FIG. 1 is a block diagram of an embodiment of a computer system with a processor having one or more processor cores and graphics processors.

FIG. 1 is a block diagram of a data processing system 100, according to an embodiment. Data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system-on-a-chip (SoC) integrated circuit for use in mobile, handheld, or embedded devices.

An embodiment of data processing system 100 can include, or be incorporated within a server-based gaming platform, a game console, including a game and media console, a mobile gaming console, a handheld game console, or an online game console. In some embodiments, data processing system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108. In one embodiment, the data processing system 100 is a wireless router or access point for use as a home network gateway, a home media server, or an combination access point/digital signage solution for public areas (e.g., hospitals).

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit data signals between processor 102 and other components in system 100. System 100 uses an exemplary 'hub' system architecture, including a memory controller hub 116 and an input output (I/O) controller hub 130. Memory controller hub 116 facilitates communication between a memory device and other components of system 100, while I/O Controller Hub (ICH) 130 provides connections to I/O devices via a local I/O bus.

Memory device 120 can be a dynamic random access memory (DRAM) device, a static random access memory (SRAM) device, flash memory device, or some other memory device having suitable performance to serve as process memory. Memory 120 can store data 122 and instructions 121 for use when processor 102 executes a process. Memory controller hub 116 also couples with an optional external graphics processor 112, which may communicate with the one or more graphics processors 108 in processors 102 to perform graphics and media operations.

In some embodiments, ICH 130 enables peripherals to connect to memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110.

Figure 2:
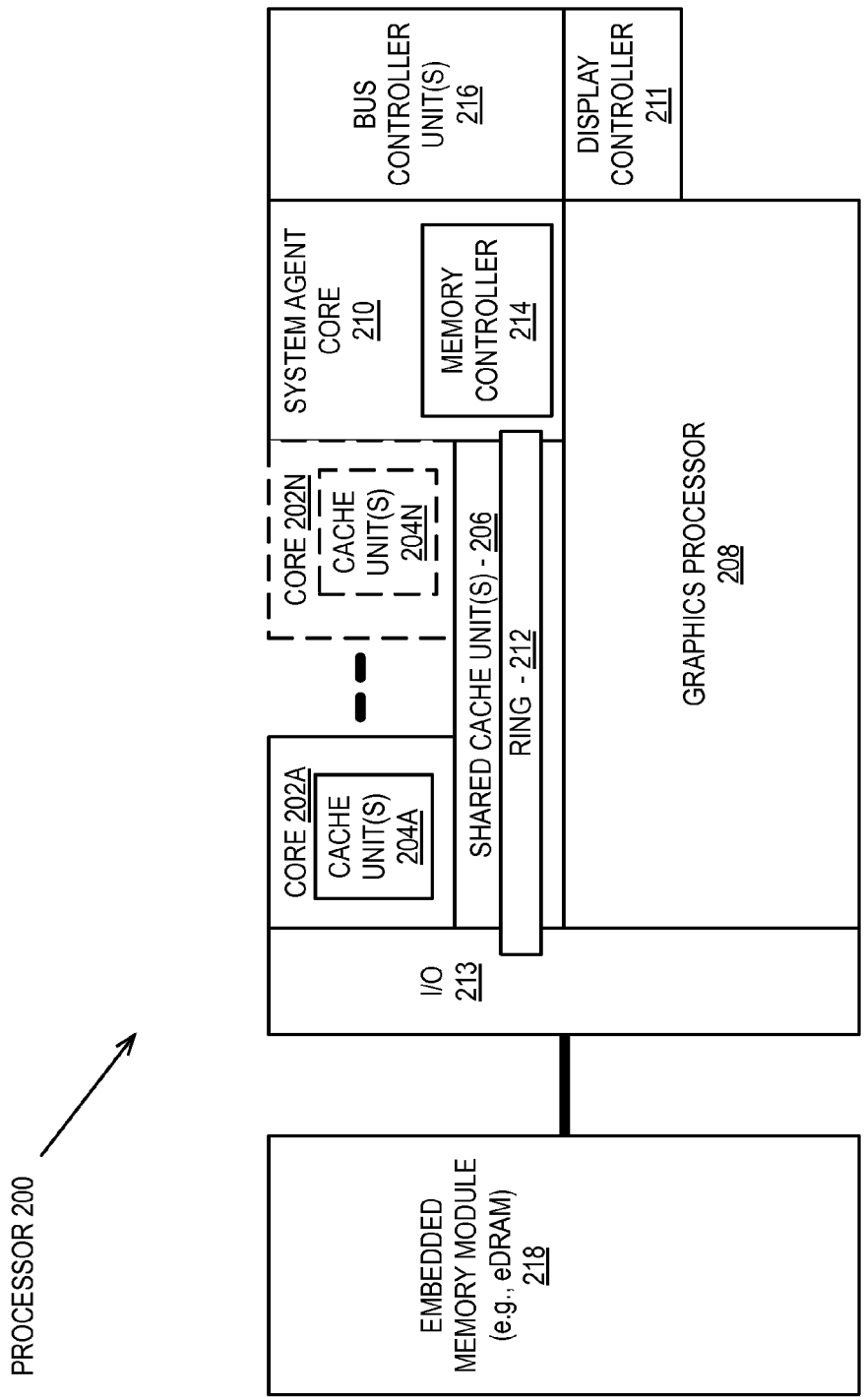
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of cores 202A-N includes one or more internal cache units 204A-N. In some embodiments each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-N.

In some embodiments, processor 200 may also include a set of one or more bus controller units 216 and a system agent 210. The one or more bus controller units manage a set of peripheral buses, such as one or more Peripheral Component Interconnect buses (e.g., PCI, PCI Express). System agent 210 provides management functionality for the various processor components. In some embodiments, system agent 210 includes one or more integrated memory controllers 214 to manage access to various external memory devices (not shown).

In some embodiments, one or more of the cores 202A-N include support for simultaneous multi-threading. In such embodiment, the system agent 210 includes components for coordinating and operating cores 202A-N during multi-threaded processing. System agent 210 may additionally include a power control unit (PCU), which includes logic and components to regulate the power state of cores 202A-N and graphics processor 208.

In some embodiments, processor 200 additionally includes graphics processor 208 to execute graphics processing operations. In some embodiments, the graphics processor 208 couples with the set of shared cache units 206, and the system agent unit 210, including the one or more integrated memory controllers 214. In some embodiments, a display controller 211 is coupled with the graphics processor 208 to drive graphics processor output to one or more coupled displays. In some embodiments, display controller 211 may be separate module coupled with the graphics processor via at least one interconnect, or may be integrated within the graphics processor 208 or system agent 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the cores 202-N and graphics processor 208 use embedded memory modules 218 as a shared Last Level Cache.

In some embodiments, cores 202A-N are homogenous cores executing the same instruction set architecture. In another embodiment, cores 202A-N are heterogeneous in terms of instruction set architecture (ISA), where one or more of cores 202A-N execute a first instruction set, while at least one of the other cores executes a subset of the first instruction set or a different instruction set.

In some embodiments, processor 200 is a part of, or implemented on, one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, processor 200 can be implemented on one or more chips or as an SoC integrated circuit having the illustrated components, in addition to other components.

Figure 3:
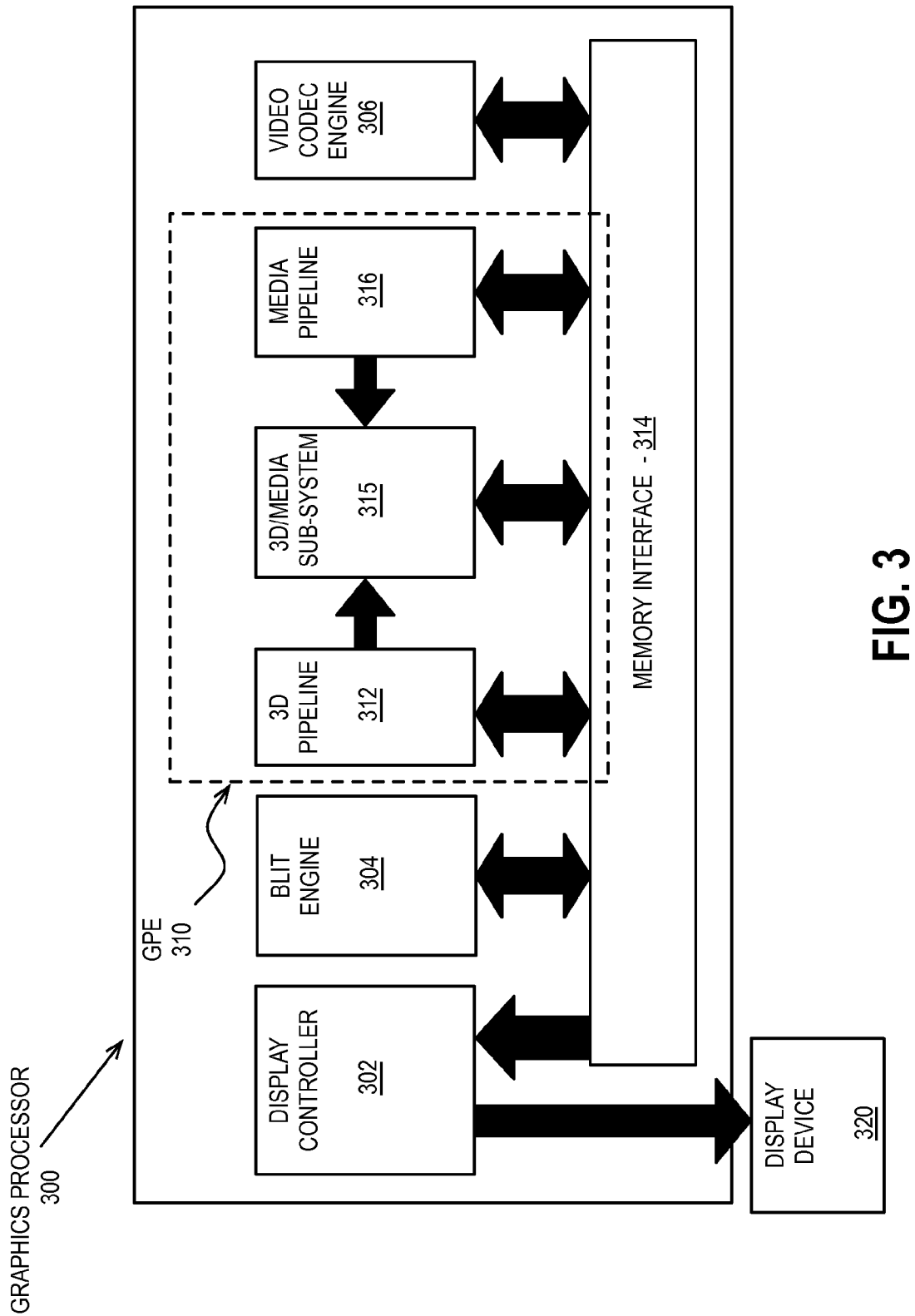
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. In some embodiments, graphics-processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media subsystem 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
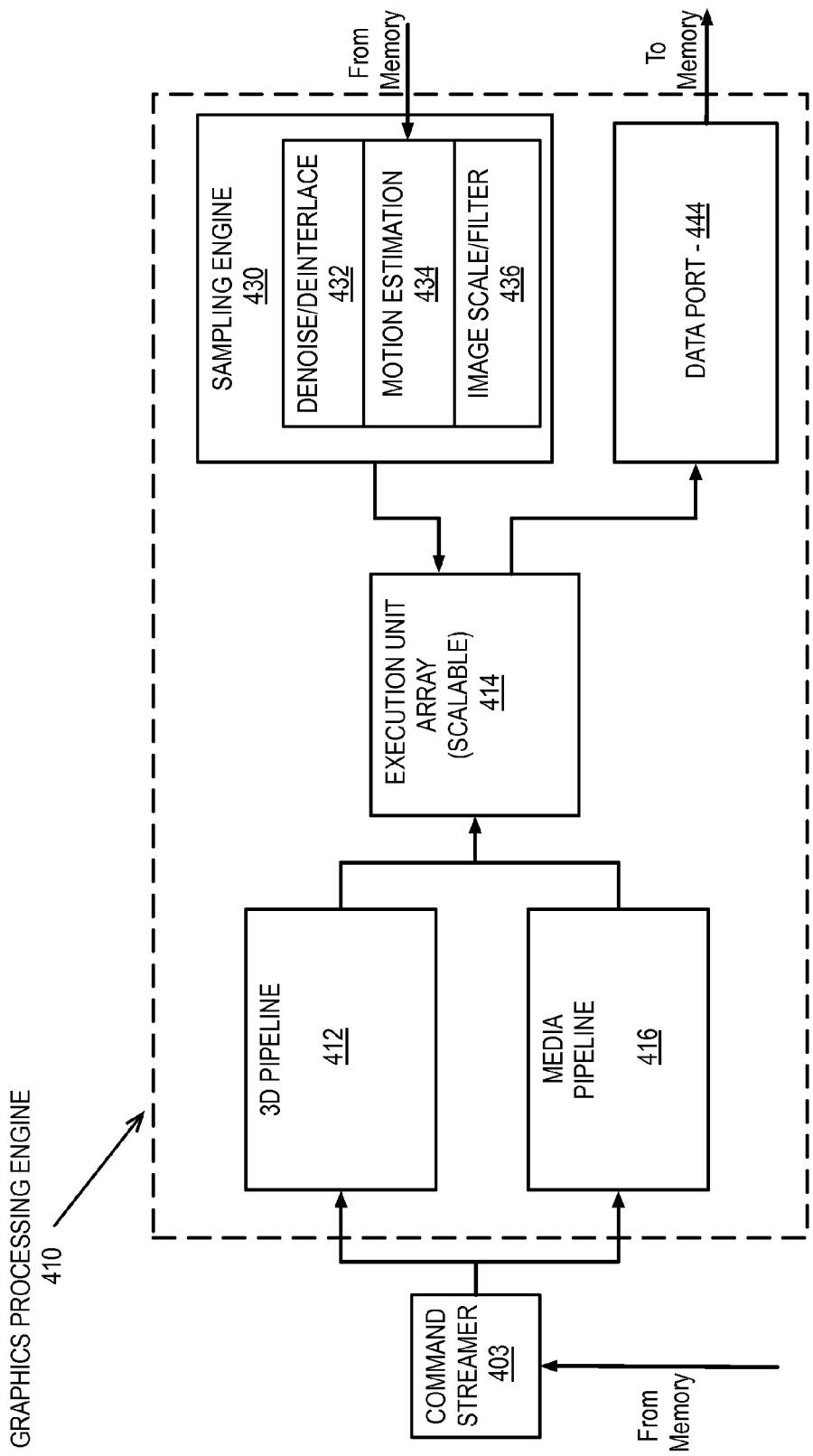
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The 3D and media pipelines process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
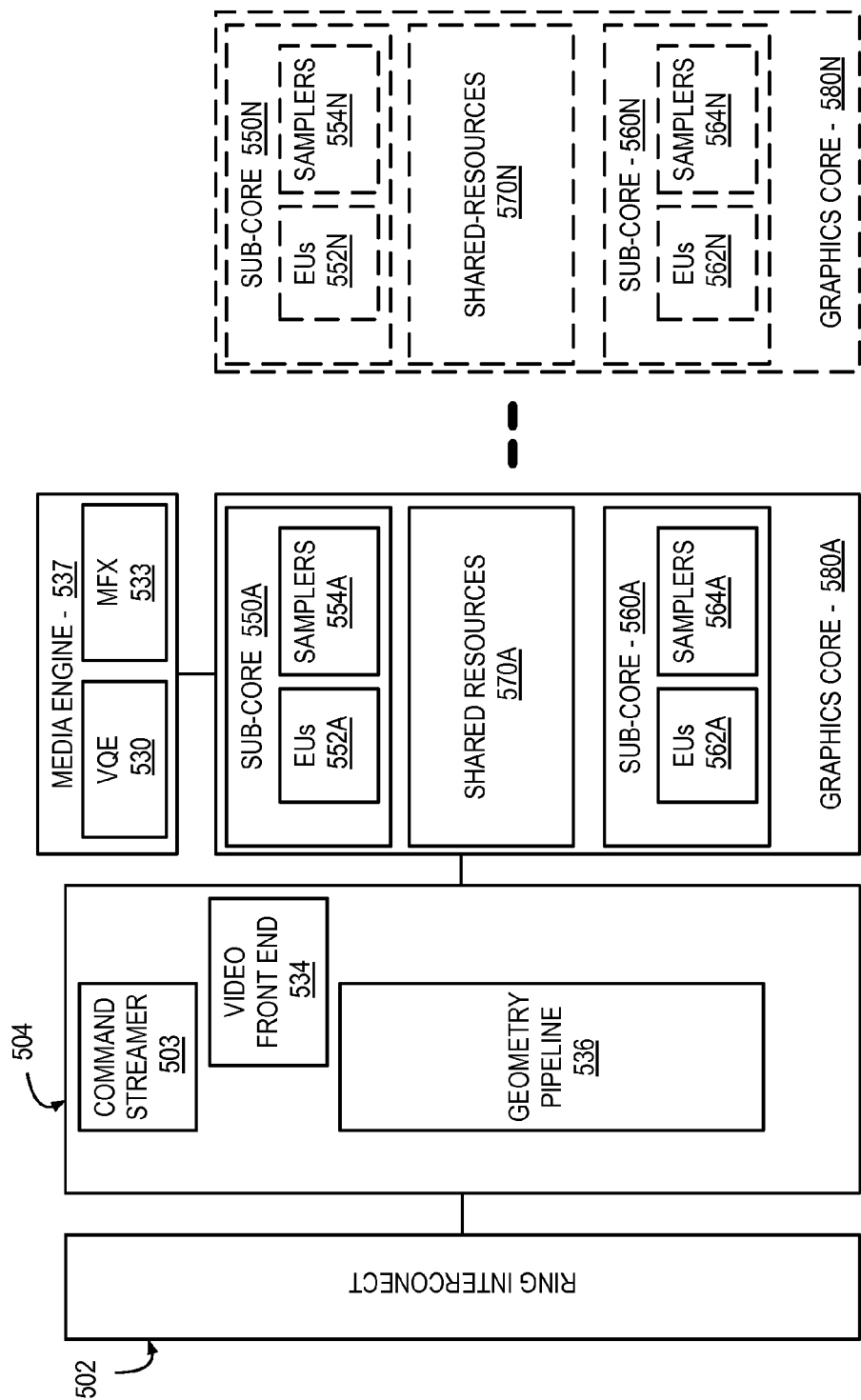
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-N (sometimes referred to as core slices), each having multiple sub-cores 550A-N, 560A-N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In some embodiments, each sub-core 550A-N, 560A-N shares a set of shared resources 570A-N. In some embodiments, the shared resources include shared cache memory and pixel operation logic. Other shared resources may also be included in the various embodiments of the graphics processor.

Figure 6:
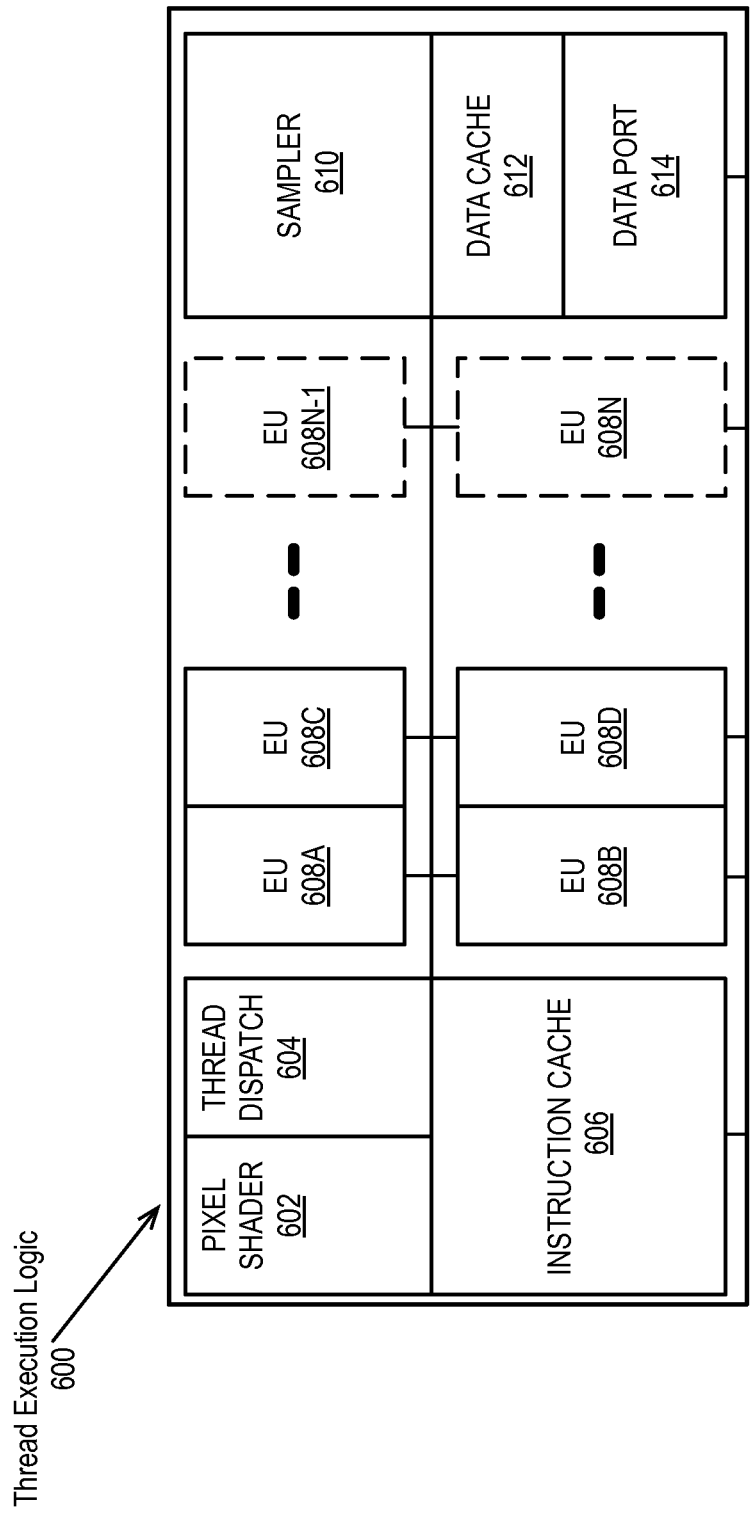
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-N. In some embodiments, each execution unit (e.g. 608A) is an individual vector processor capable of executing multiple simultaneous threads and processing multiple data elements in parallel for each thread. In some embodiments, execution unit array 608A-N includes any number individual execution units.

In some embodiments, execution unit array 608A-N is primarily used to execute "shader" programs. In some embodiments, the execution units in array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an API-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
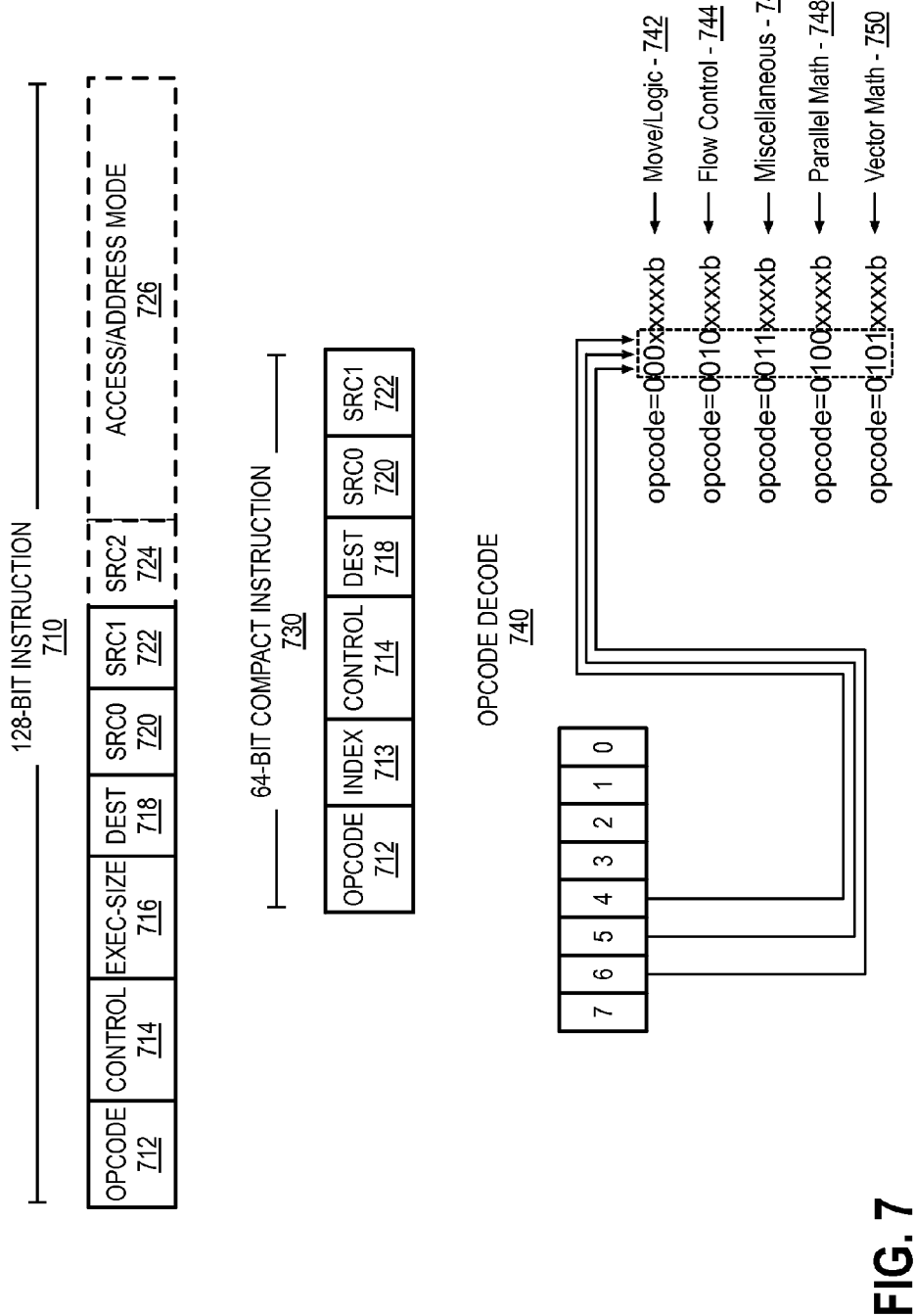
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 712 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. In one embodiment, the address mode portion of the access/address mode field 726 determines whether the instruction is to use direct or indirect addressing.

In some embodiments instructions are grouped based on opcode bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb (e.g., 0x0x) and logic instructions are in the form of 0001xxxxb (e.g., 0x01). A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
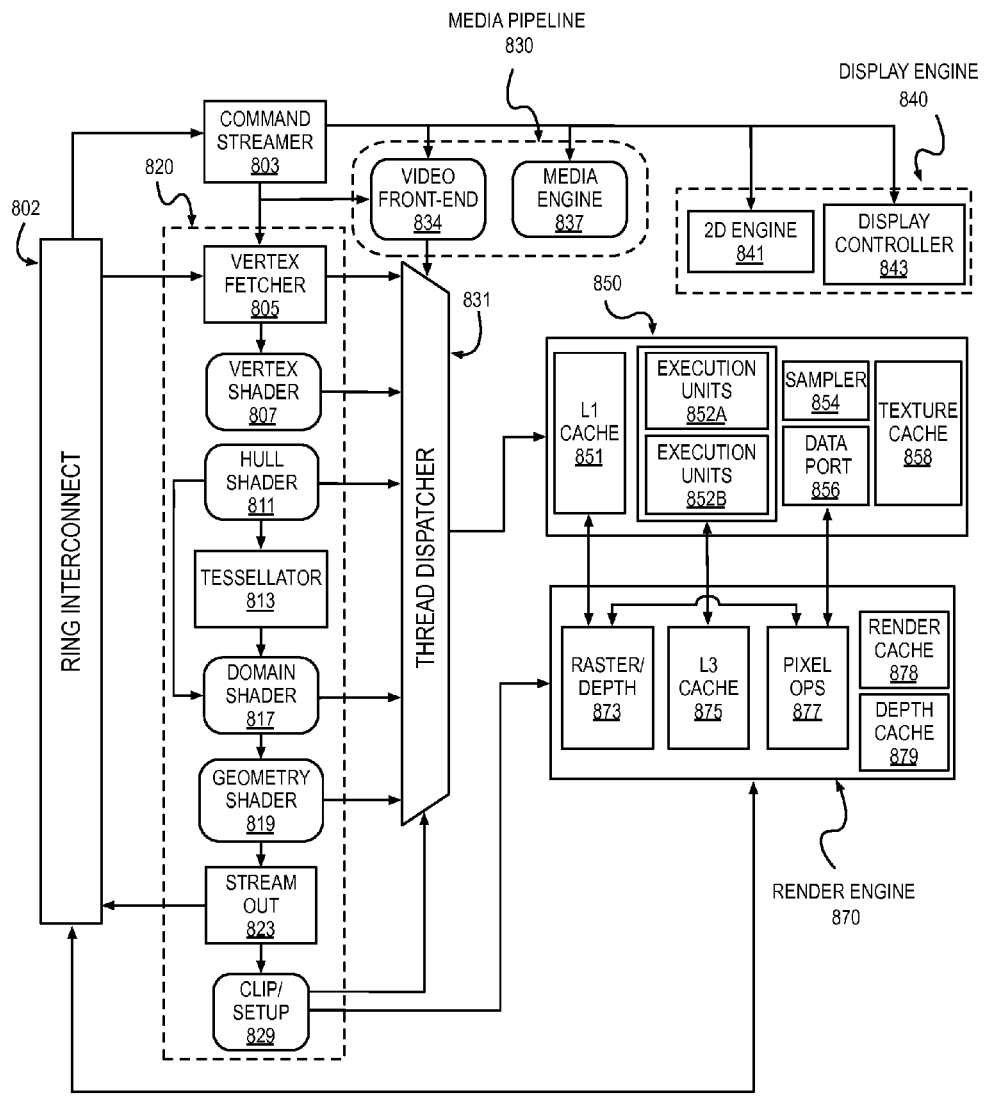
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and render engine 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access unrasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. Associated render and depth buffer caches 878, 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
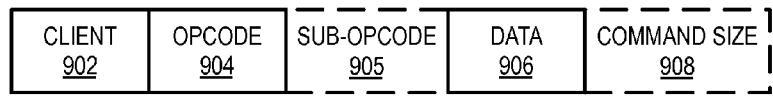
FIG. 9A is a block diagram illustrating a graphics processor command format according to an embodiment.
Figure 9B:
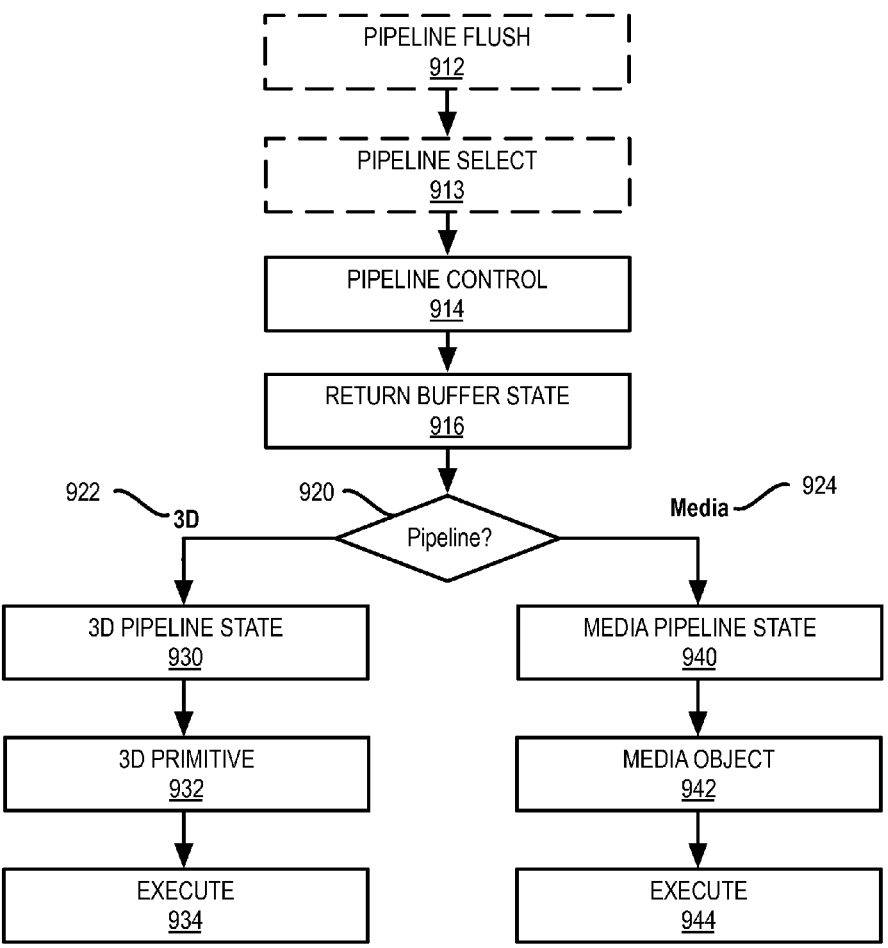
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, sample command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
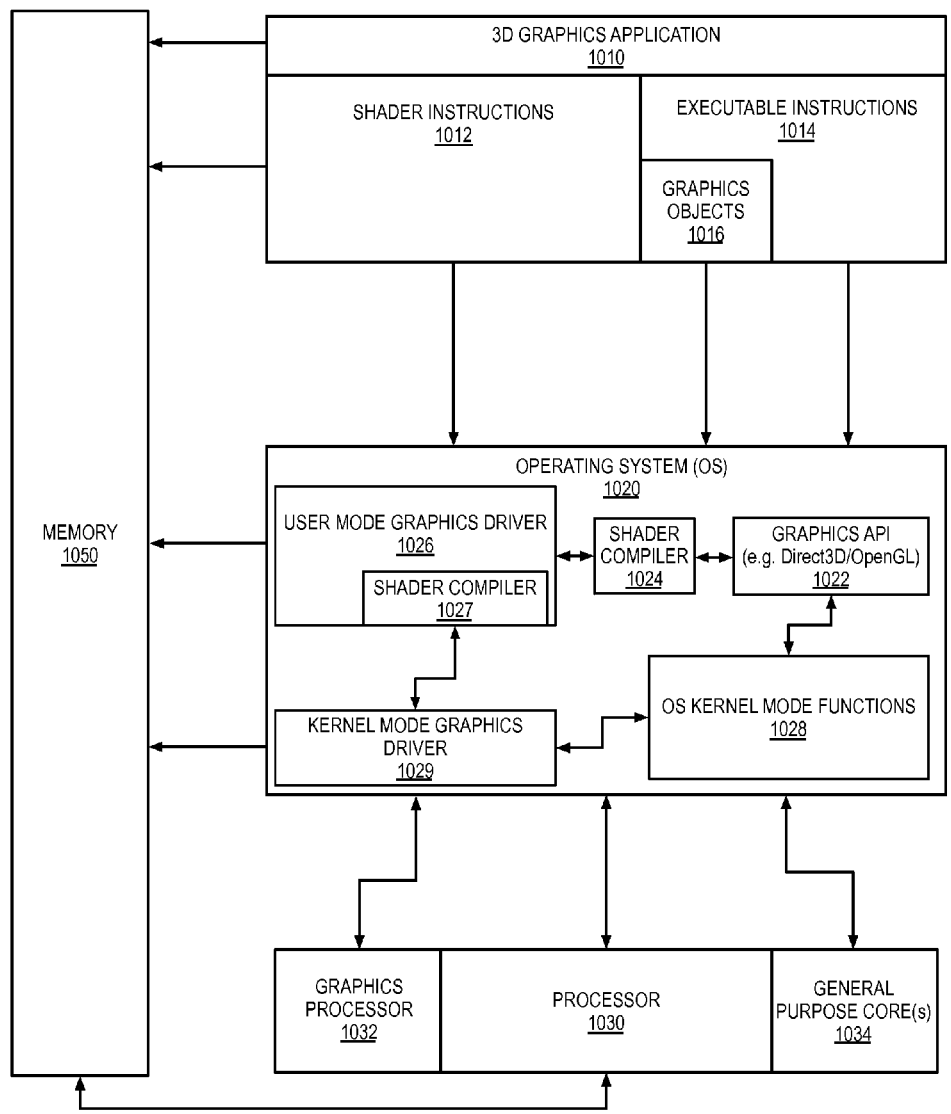
FIG. 10 illustrates exemplary graphics software architecture for a data processing system according to an embodiment.

FIG. 10 illustrates exemplary graphics software architecture 1000 for a data processing system according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

Graphics Translation Tables

Figure 11:
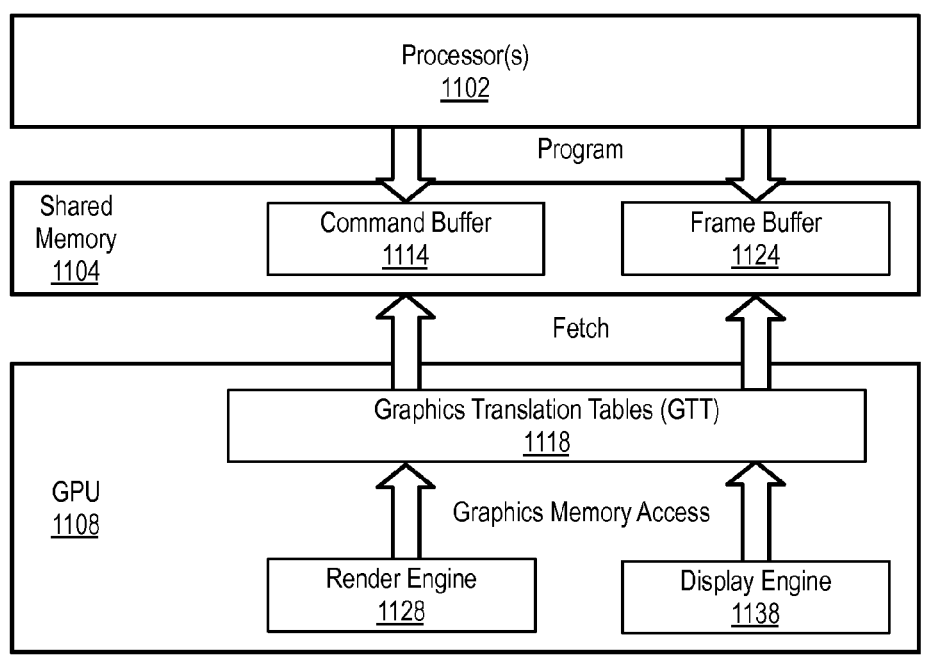
FIG. 11 provides an overview of an exemplary GPU programming model including graphics translation tables, according to an embodiment.

FIG. 11 provides an overview of an exemplary GPU programming model including graphics translation tables, according to an embodiment. The programming model illustrates interaction between one or more system processors 1102 and a GPU 1108 using shared memory 1104, which in one embodiment is system memory. The shared memory includes a command buffer 1114 and a frame buffer 1124. A set of graphics translation tables (GTT) are used to enables graphics memory access to the system memory that includes the command buffer 1114 and frame buffer 1124.

In one embodiment, the one or more system processors 1102 program the GPU 1108 using GPU-specific commands, such as those described in FIG. 9A-B. In one embodiment, a graphics driver programs commands into the command buffer 1114 stored in system memory 1104. In one embodiment, one or more processors inform the GPU when the commands are ready to be executed, for example, via processor specific methods such as the tail register of a rendering ring buffer and/or the submission of an execution list. The render engine 1128 of the GPU 1108 then fetches and executes the commands in the command buffer 1114. The fetch and execution may occur immediately after the processor notifies the GPU that commands in the rendering ring are ready, or the fetch may occur at a later point based on GPU internal scheduling or management policy.

In one embodiment the GPU performs a single fetch of all pending commands and instructions, uses the GTT for translation, and stores the GTT data in an internal cache before beginning to execute the graphics commands. In one embodiment, the GPU fetches and executes the instructions based on internal resource availability and may refer to the GTT multiple times for memory translation while processing graphics commands. In one embodiment, the GPU rendering engine executes independently of any of the one or more processors and the processors and the GPU should avoid assumptions regarding the execution speed of any other counterpart. The availability of an execution result from either a processor or the GPU should not be assumed absent an explicit synchronization event between a processor and the GPU.

In one embodiment the render engine 1128 performs graphics operations based on the commands and outputs rendered data to a render target in memory, which is ultimately written to the frame buffer 1124 in memory. In one embodiment, the one or more processors may perform some operations in parallel with the GPU 1108 and output those results to the frame buffer 1124. The display engine then fetches pixel data from the frame buffer 1124 and outputs the pixel data to a display.

In some embodiments, system memory can be mapped into multiple virtual address spaces by GTT 1118. In one embodiment a 2 GB global virtual address space is accessible from both the GPU 1108 and the one or more processors 1102 and is mapped through a global page table in the GTT 1118. In one embodiment, local graphics memory is supported for the render engine via multiple 2 GB local virtual address spaces.

Figure 12:
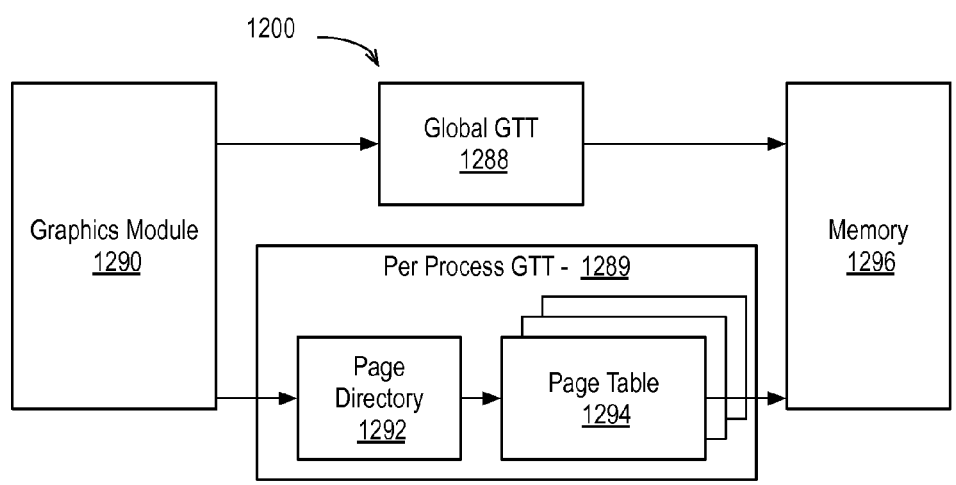
FIG. 12 is a block diagram of exemplary global and per process graphics translation tables, according to an embodiment.

FIG. 12 shows exemplary global and per process graphics translation tables within the graphics virtualization environment, according to an embodiment. In one embodiment the graphics virtualization environment 1200 includes a global GTT 1288 and a per-process GTT 1289 to configure access to memory 1296 for a graphics module 1290 (e.g., render engine 1128, display engine 1138 of FIG. 11). In one embodiment the local, per-process GTT is implemented using a two-level paging structure. The first level includes page directory entries (PDEs) in a page directory table (PDT) 1292. The PDEs in the page directory 1292 contain page table base addresses. The second level includes the page tables (e.g., 1294). Each page table 1294 includes page table entries (PTEs) storing page frame addresses (e.g., page frame numbers) in physical memory that are mapped to the graphics module 1290.

Although illustrated as separate, in one embodiment at least some of the entries in the page table directory 1292 of the per-process GTT are included in the global GTT 1288.

GPU Virtualization

The embodiments described herein may be virtualized by a GPU virtualization system. The GPU virtualization enables a virtual GPU (vGPU) within a virtual machine to access the full functionality provided by GPU hardware. The virtual GPU may be presented to multiple guest virtual machines (VMs). The guest VMs can access the full array of GPU features and use native GPU driver software to manage virtual graphics processors. The vGPU context is switched per quantum or event, where a vGPU of each VM periodically becomes an "owner guest." In one embodiment the context switch may happen per GPU rendering engine. The periodic switching allows multiple VMs to share a physical GPU in a manner that is transparent to the users.

In one embodiment, the virtual GPU manages graphics memory mapping via guest and shadow graphics translation tables (GTT), which map graphics processor memory to system memory. Each VM has a guest GTT to translate from the graphics memory page number to the guest memory page number (GPN). The shadow GTT entries are translated from the graphics memory page number to a host memory page number (HPN). In one embodiment the shadow GTT is shared and maintains the translations for multiple VMs. In one embodiment, each VM includes both per-process and global GTTs. The GTT synchronization mechanisms described herein may be used to synchronize both global and per process GTTs.

In one embodiment, the guest and shadow GTTs are synchronized via a hybrid shadow construction scheme (HSCS) which implements either a synchronous or asynchronous shadow GTT implementation based on guest GTT access heuristics. In one embodiment, during synchronous operation the memory page of a guest GTT is write protected. Each update to the guest GTT causes a write-protection trap that is handled by the mediator. A VM mediator handles the trap by performing the corresponding updates to both the shadow GTT and the guest GTT per policy. In one example, the guest GTT may be updated with GPN, and the shadow GTT may be updated with HPN. In synchronous operation the guest and shadow GTT are kept synchronized even when the guest is not the owner guest. In asynchronous operation the guest GTT is not write protected and the guest may freely update the GTT entries. When the guest VM becomes the owner guest of a certain rendering ring, a processor can inform the GPU that commands are ready to execute (e.g., through a tail register update). In one embodiment, the VMM traps the notification and rebuilds the shadow GTT before submitting the commands. In one embodiment, the guest GTT may be allowed to be out of synchronization (e.g., operate asynchronously) with the shadow GTT until commands are actually submitted to the physical GPU.

Figure 13:
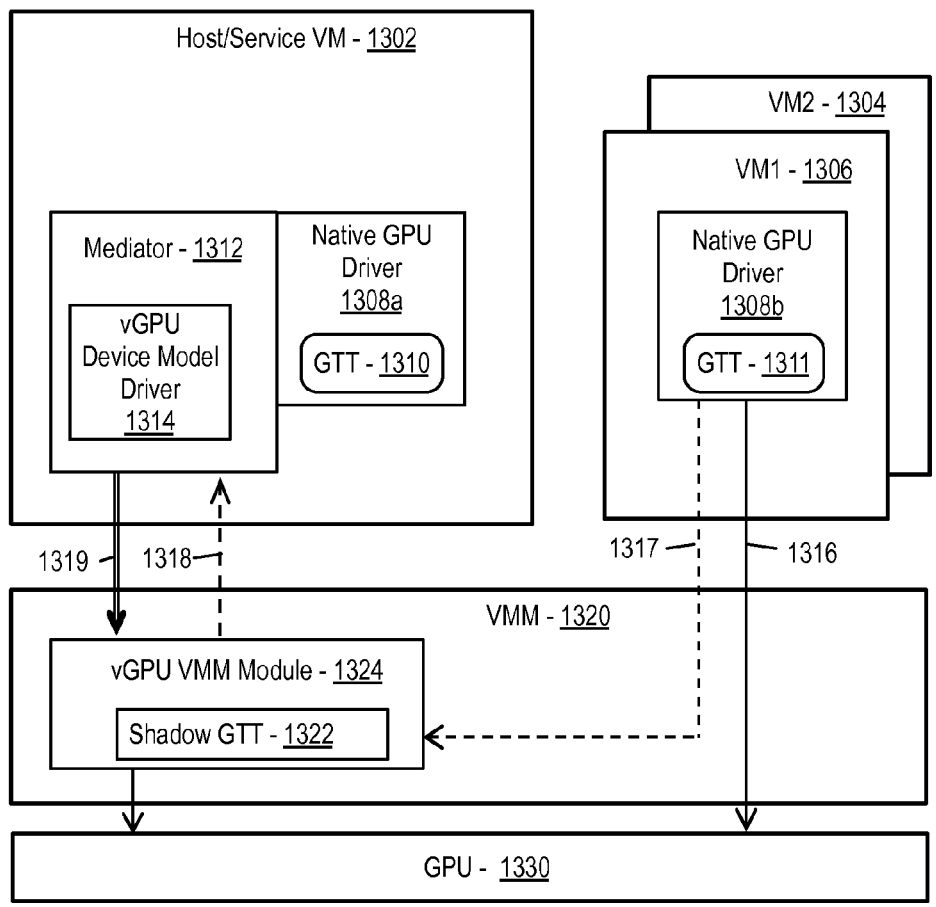
FIG. 13 is a block diagram of exemplary graphics virtualization environments according to an embodiment.

FIG. 13 is a block diagram of an exemplary graphics virtualization environment according to an embodiment. In one embodiment the virtualization environment includes a host or service VM 1302, which can be a host operating system that interfaces with a hosted (e.g., type-two) hypervisor/virtual machine monitor (VMM) 1320 where the VMM resides as part of host OS kernel components, or a privileged service VM operating on a bare metal (e.g., type-1) VMM 1320 interface where the VMM sits under the privileged service VM. The VMM 1320 provides virtualized access to a graphics processor (e.g., GPU) 1330 for one or more guest VMs (e.g., VM1 1304, VM2 1306). The guest VMs 1304, 1306 and the host/service VM 1302 may be loaded with native GPU drivers 1308a-b, which are versions of the GPU driver software that is used to control an un-virtualized GPU. In one embodiment the host/service VM 1302 additionally includes a mediator 1312 that includes a vGPU device model driver 1314 to manage GPU virtualization via a vGPU VMM module 1324 within the VMM 1320. The mediator 1312 may be part of the native GPU driver, or a separate module.

In one embodiment, the operation of the mediator differs based on the use of a type-one or type-two hypervisor. For a type-two hypervisor, hooks may be placed into the driver code for the vGPU to make calls to access functions provided by the mediator 1312. For a type-one hypervisor, software traps may be used to enable the mediator 1312 to provide functionality to the vGPU. It will be understood that where traps, or the use of the trap-and-emulate model is described herein, similar functionality may be provided using a type-two hypervisor using software hooks in the driver code to access the vGPU mediator 1312. Accordingly, embodiments described herein are not limited to any particular type of hypervisor.

In one embodiment, a mediated pass through is enabled in which guest VMs 1304, 1306 can directly access performance-critical resources within the GPU 1330 without intervention from the VMM 1320. In such embodiment, performance critical operations from VMs (e.g., render operations) can be performed using a pass through call 1316 to the GPU 1330. However, privileged graphics operations from the VMs 1304, 1306 are handled using a trap-and-emulate model in which the VM access 1317 triggers a software trap that is routed 1318 to the mediator 1312. The mediator 1312 can then emulate the trap and perform the corresponding operations on the GPU hardware. In one embodiment configured for a type-one hypervisor, the mediator 1312 emulates the trap via a hypervisor call 1319 to the vGPU VMM Module 1324 in the VMM 1320, which has privileged access to the GPU 1330. In one embodiment configured for a type-two hypervisor, the mediator 1313 emulates the trap and operates the GPU hardware via native driver 1308a of host OS where the native drive 1308a operates in a privileged mode.

In one embodiment the vGPU context is switched per quantum, where each VM periodically becomes an "owner guest." This periodic switching allows multiple VMs to share a physical GPU in a manner that is transparent to users of the VM. For example, the guest may prepare command buffers and program the virtual GPU's graphics state using when the VM is not the owner guest of GPU. The VMM may submit the prepared command buffers to the GPU when the VMs become the owner guest of vGPU. In one embodiment, when a VM is the owner guest, the VM commands in the command buffer are provided to a render engine in the GPU 1330 (e.g., render engine 1128 of FIG. 11).

Each native graphics driver of the guest VM (and service VM in a type-one hypervisor can have a separate guest GTT 1311, 1310, which includes global and per-process GTTs. The mediator 1312, using the vGPU device model driver 1314, shadows the guest GTTs 1311, 1310 to the shadow GTT 1322 either synchronously with each guest GTT modification or asynchronously before render commands are submitted. In a type-two VMM, the native graphics driver of host may manage a separate shadow GTT in addition.

Processes executing GPU workloads tend to allocate and free graphics memory in batches, which reduces the impact of GTT modifications on the rendering process. Thus, the trap and emulate overhead caused by keeping the guest GTT synchronous to the shadow GTT is generally limited. However, performance issues may arise in cases where the guest frequently manipulates the GTT. For example, some media transcoding benchmarks realize poor virtualization performance due to frequent swapping of graphics memory pages, which introduces a large number of GTT modifications.

In one embodiment, the mediator 1312 includes logic to determine that a guest is performing a number of contiguous GTT page modifications or is performing repeated modifications to the same GTT entry. In one embodiment, the logic is to determine a number of GTT page table modifications that exceeds a defined threshold within a period (e.g., 500 updates per second). The precise threshold may be dynamically determined in some embodiments. Based on this determination, the mediator can remove the write protection on the guest GTT and transition into asynchronous operation, in which the guest GTT will be out-of-synchronization from the shadow GTT until the guest VM commands are ready to be presented to the graphics hardware. In one embodiment the mediator then rebuilds and switches the shadow GTT when a VM becomes an owner guest In one embodiment, the mediator rebuilds the shadow GTT to synchronize with the guest GTT when new vGPU commands are to be submitted to the physical GPU.

Figure 14:
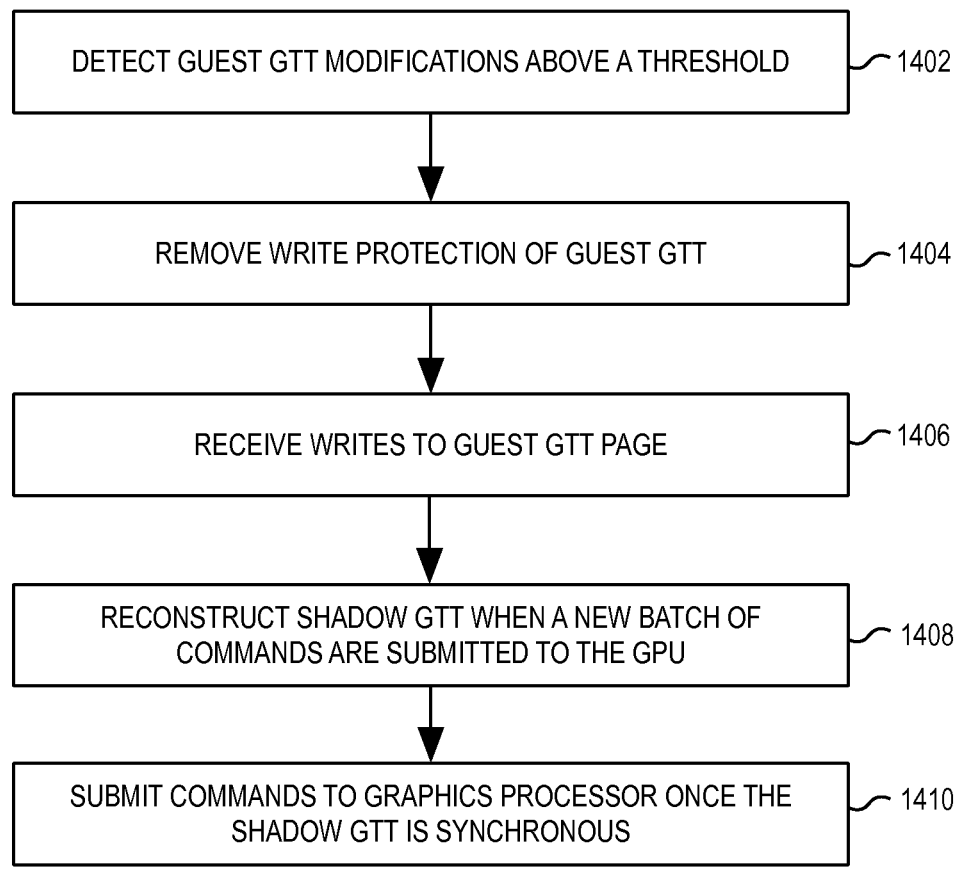
FIG. 14 is a flow diagram of logic to enter an asynchronous mode for a guest graphics translation table.

FIG. 14 is a flow diagram of logic to enter an asynchronous mode for a guest graphics translation table. Analysis of the access patterns to the guest GTT reveals that guests VMs perform guest GTT (e.g., global or per process GTT) modifications in contiguous blocks. In one embodiment, if the access pattern reveals a number of contiguous GTT modifications, or repeated modifications to same GTT page, the mediator may consider whether to asynchronously shadow the guest GTT, or at least a portion of the guest GTT.

In one embodiment, as shown at 1402, a mediator can be configured to detect blocks of GTT modifications at a number and frequency above a determined threshold. In response to the detection, the mediator can transition to asynchronous shadow GTT operation. Asynchronous shadow GTT operation can begin at block 1404 when the mediator removes the write protection on the guest GTT and allows the GTT to go out-of-synch with the shadow GTT. For a period of time, as shown at block 1406, the guest GTT will receive writes from the guest VM. When the guest vGPU is scheduled in (e.g., the vGPU context is loaded to the physical GPU) and/or a new batch of guest vGPU commands are ready to be submitted to the GPU, the shadow GTT is reconstructed, as shown at 1408. Once the shadow GTT is reconstructed using the guest GTT, the guest VM commands can be submitted to the graphics processor, as shown at 1410.

Figure 15A:
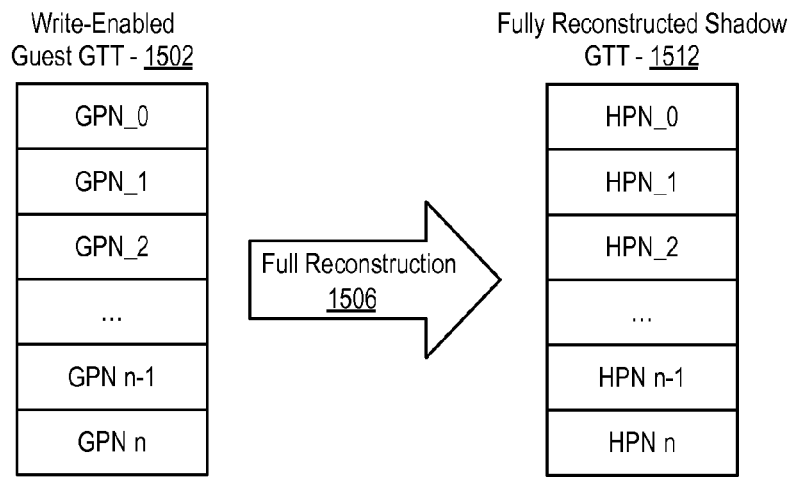
FIG. 15A-B are block diagrams of shadow graphics translation table reconstruction, according to an embodiment.
Figure 15B:
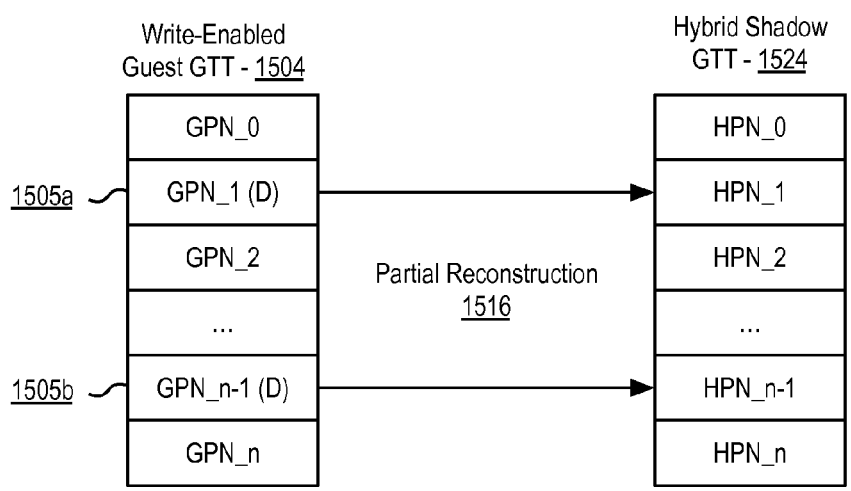

FIGS. 15A-B are block diagrams of shadow graphics translation table reconstruction, according to an embodiment. FIG. 15A illustrates a full reconstruction 1506 of a shadow GTT. FIG. 15B illustrates a partial reconstruction 1516 of a shadow GTT.

As shown in FIG. 15A, an entire write-enabled guest GTT 1502 (e.g., global GTT 1388 or per process GTT 1389 of FIG. 13), which has been allowed to go out of sync with the existing shadow GTT, is used to create a fully reconstructed shadow GTT 1512. In one embodiment the fully reconstructed shadow GTT is re-created from scratch when new commands are submitted to the GPU. During the reconstruction, each page directory entry or page table entry in the guest GTT is audited to ensure that it references memory that the guest VM is allowed to access.

As shown in FIG. 15B, a portion of a write-enabled guest GTT 1504 (e.g., global GTT 1388 or per process GTT 1389 of FIG. 13) is used to create a hybrid shadow GTT 1524 which uses partial reconstruction 1516, where a portion of the shadow GTT pages are synchronized with guest GTT, but another portion of shadow GTT are not. The selection of partial reconstruction or full reconstruction may be performed heuristically based on the number of GTT pages the guest modifies at any given time. For example, if the number of modified pages of the guest GTT 1504 is below a threshold, partial reconstruction may be performed, in which the dirty bits (e.g., modified status indicator bits) of the page table entries or page directory entries of the guest GTT 1504 may be used to determine which page frame numbers have been modified by the guest VM, and only synchronize the shadow GTT pages corresponding with modified guest GTT pages. The partially reconstructed shadow GTT 1524 can be created by copying or re-using the existing shadow GTT as a base and updating only the GTT entries that are out of synchronization with the guest GTT.

Determining the modified guest pages may be performed using a number of different techniques in addition to using the guest page dirty bits. In one embodiment, the modified GTT pages are determined via the guest fault address from a guest VM access to a write-protection guest GTT page. In one embodiment, the VMM may use a separate data structure (e.g. link table, hash table, linear array) to track the list of guest pages in the guest GTT that are allowed to be asynchronous with the shadow GTT and use the data structure to determine which of the modified guest GTT pages to synchronize to corresponding shadow GTT pages, and/or uses the additional "dirty" bit to narrow the list of pages to synchronize.

In another embodiment, if the number of guest GTT pages allow to be out of synchronization with the shadow GTT is very large, and guest GTT pages are not always modified at each time the shadow GTT is reconstructed, the dirty bit of an upper level page table may be used to further narrow the process of identifying the GTT pages that are to be updated during the reconstruction of the shadow GTT. As illustrated, GPN_1 1505*a* and GPN_n-1 1505*b* each have a page table dirty flag set for the page table or page directory entry of the write-enabled GTT 1504. Thus, the exemplary partially reconstructed shadow GTT 1524 can be created by updating the existing shadow GTT with the page frame or page table data contained in the dirty page table entries 1505*a-b*.

Figure 16:
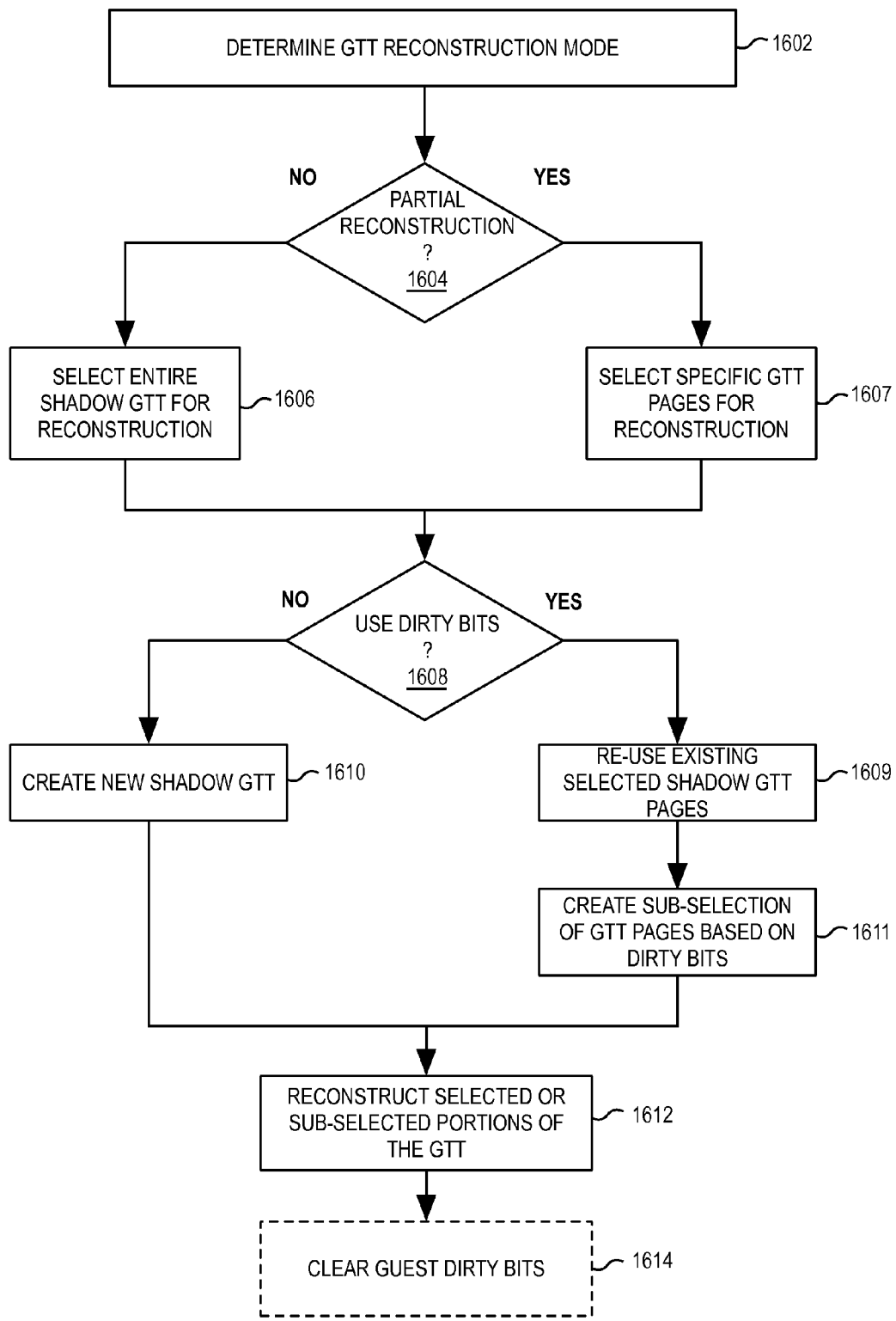
FIG. 16 is a flow diagram of logic to reconstruct at least a portion of a shadow graphics translation table.

FIG. 16 is a flow diagram of logic to reconstruct at least a portion of a shadow graphics translation table. In one embodiment, as shown at 1602, a virtual GPU mediator (e.g., mediator 1212 of FIG. 12) determines a reconstruction mode for a GTT or a portion of the GTT. In one embodiment, for the portion of the GTT managed by the asynchronous mode, the shadow GTT can be rebuilt using partial or full reconstruction, as determined at 1604. In one embodiment, the shadow GTT is rebuilt when the commands of the guest vGPU are submitted to the physical GPU. If the GTT will not be partially reconstructed, the mediator can select the entire shadow GTT for reconstruction at 1606. Otherwise, if partial reconstruction is enabled at 1604, the mediator can select specific GTT pages, base on the data structure mentioned in 00132, for reconstruction at 1607.

At 1608 the mediator determines if all of the selected out-of-synch pages are to be reconstructed (e.g., the entire shadow GTT if full reconstruction is enabled or all of the selected GTT pages if partial reconstruction is enabled). If only dirty pages are to be reconstructed, at 1609 the mediator can copy or re-use the existing selected shadow GTT pages and, at block 1611, create a sub-selection of the selected GTT pages based on the dirty bits in the page table or page directory entries of the guest GTT. If the shadow GTT is to be fully reconstructed, a new shadow GTT is created at 1610.

At 1612, the new or existing shadow GTT is reconstructed using the selected or sub-selected portion of the shadow GTT, which can be the entire GTT, the previously selected specific GTT pages, or the shadow GTT entries associated with the sub-selected portion of the guest GTT based on the guest GTT dirty bits. In one embodiment, the guest dirty bits are optionally cleared after reconstruction, as shown at 1614.

Figure 17A:
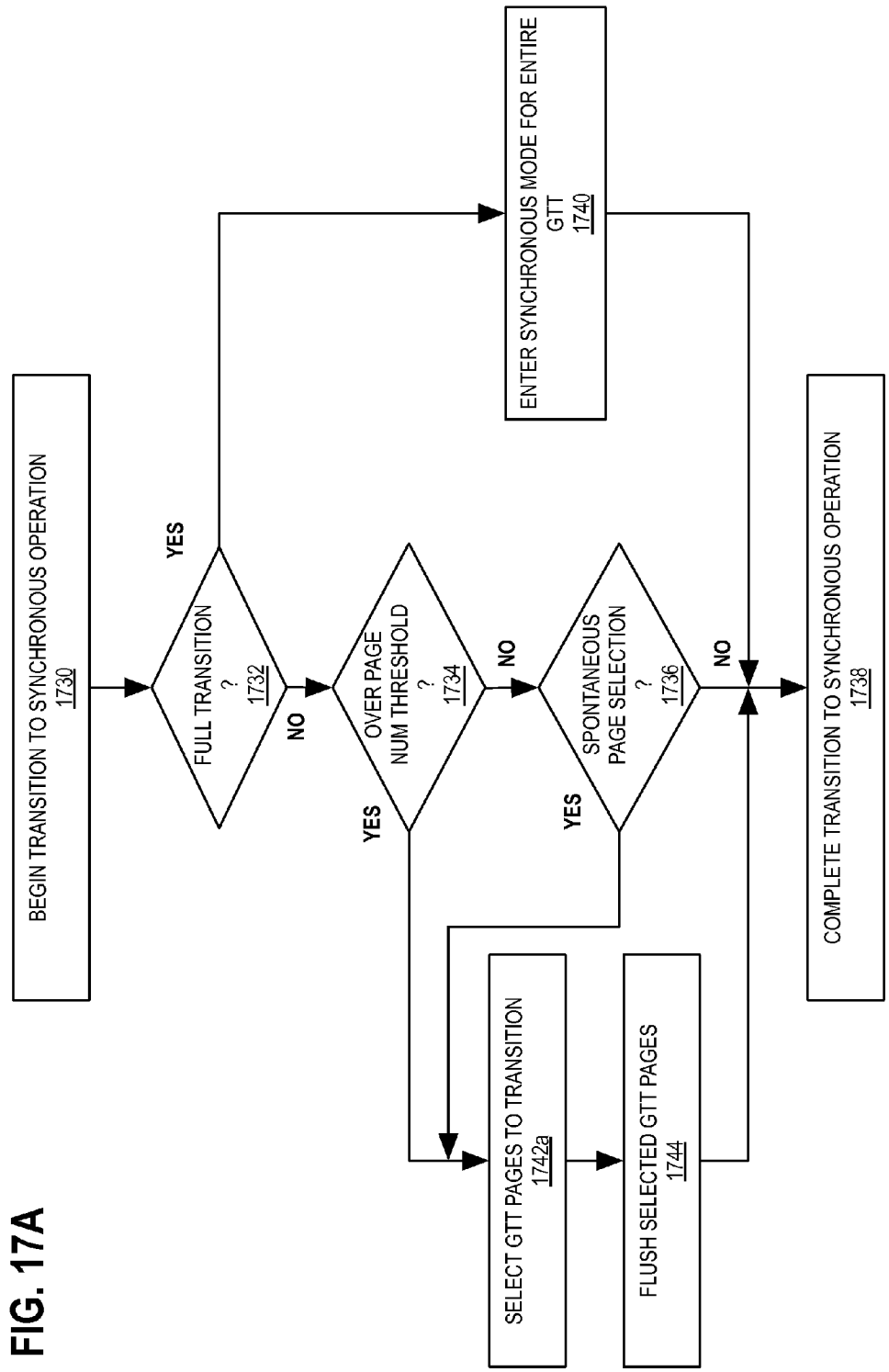
FIG. 17A-B are flow diagrams including logic to exit an asynchronous mode for a guest graphics translation table.
Figure 17B:
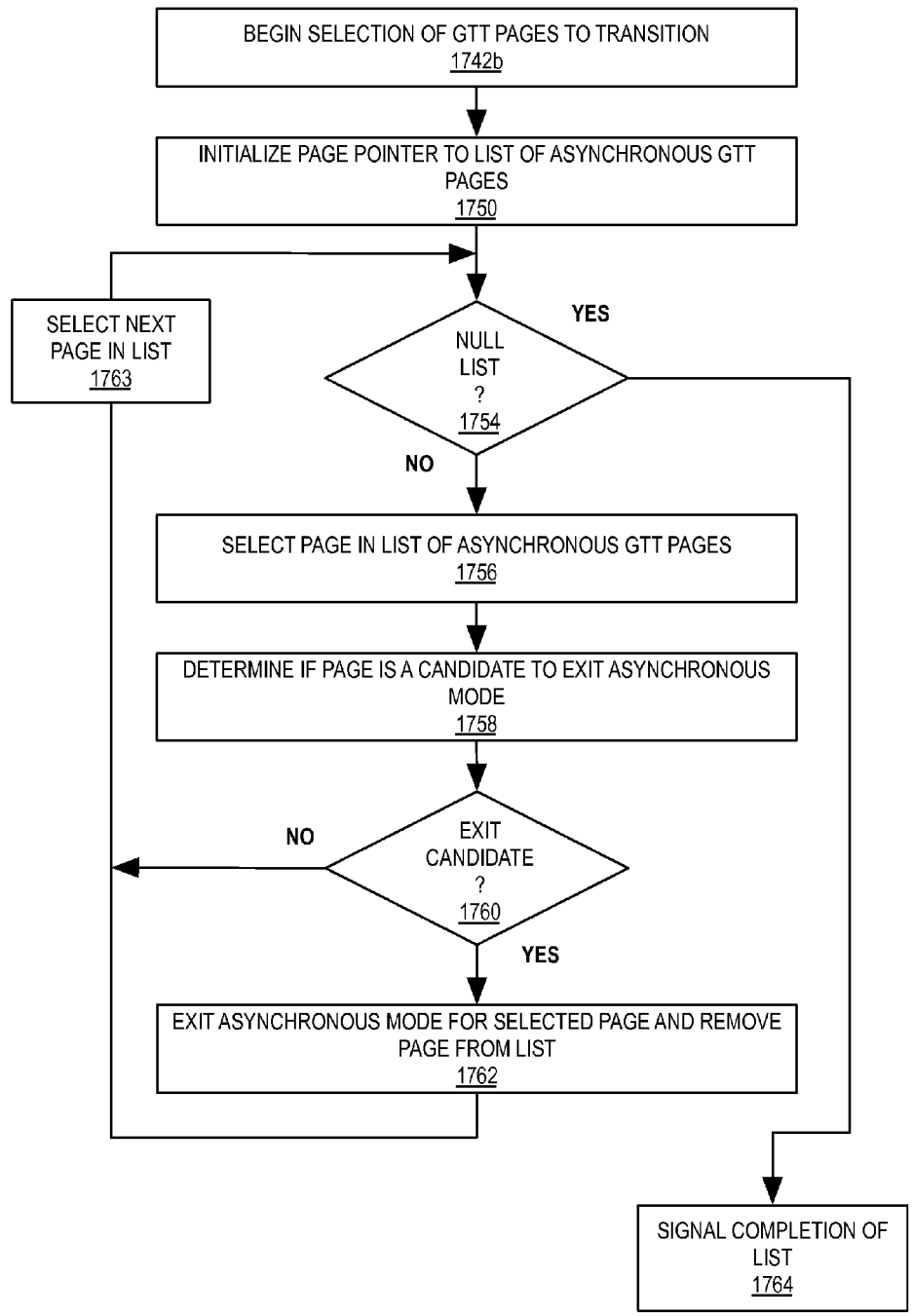

FIGS. 17A-B are flow diagrams illustrating exemplary logic to transition out of the asynchronous mode of operation for a GTT and to transition at least a subset of the GTT to synchronous operation. In one embodiment, after performing operations illustrated in FIG. 14, including submitting commands to the graphics processor once the relevant shadow GTT(s) are synchronous, the mediator, via the vGPU VMM module (e.g., mediator 1312 and vGPU VMM module 1324 of FIG. 13) may determine to exit asynchronous operation and return to synchronous operation between the guest and shadow GTT. While operations are shown sequentially, in some embodiments the operations illustrated may be performed at least partially in parallel. For example, multiple independent determinations and evaluations may be performed simultaneously. Moreover, different portions of a guest global or per-process GTT may be managed in different operational modes, such that a portion of a GTT may be managed synchronously while a different portion of the GTT is managed asynchronously. Additionally, a global GTT may be managed synchronously, while at least a portion of a per-process GTT is allowed to operate asynchronously from the associated per-process shadow GTT pages until commands are submitted to the GPU.

FIG. 17A is a flow diagram including logic to transition at least a portion of a GTT to synchronous operation, according to an embodiment. FIG. 17B is a flow diagram including logic to select and transition a set of GTT pages to synchronous operation, according to an embodiment.

In one embodiment, when beginning a transition to synchronous operation, as shown at 1730 of FIG. 17A, the mediator determines whether to perform a full transition of the GTT at 1732. If the entire global or per-process GTT is to transition to synchronous mode, the mediator can transition the entire GTT to synchronous mode at 1740. In one embodiment, the full transition triggers a full reconstruction of the associated shadow GTT when completing the transition to synchronous operation at 1738.

In one embodiment a transition to synchronous mode can be performed for less than the entire GTT. For example, if the mediator determines at 1734 that the transition to synchronous operations was triggered because the number of asynchronous GTT pages exceeds a page number threshold, the mediator can select certain GTT pages to transition at 1742*a*. Alternatively, as shown at 1736, a spontaneous page selection may be performed by the mediator logic for various reasons. For example, in one embodiment the age of the asynchronous GTT pages are monitored to determine if the age of the pages exceeds an age threshold. If a certain number of pages are over the age threshold, the mediator logic may select all or some of the older pages at 1736 to transition to synchronous operation at 1742*a*.

The selection of GTT pages at 1742*a* may be performed based on a pre-determined policy or based on a dynamic policy that may be modified at runtime. Exemplary logic for to selecting and transitioning individual GTT pages at 1742*a* is included in FIG. 17B. At 1744 any cached versions of the GTT pages in hardware are flushed and those pages are transitioned to synchronous operation. The mediator may then complete the transition to synchronous operation at 1738. In one embodiment, transitioning a subset of GTT pages triggers a partial reconstruction of the associated shadow GTT.

The selection of GTT pages at 1742*a* of FIG. 17A begins, in one embodiment, at 1742*b* of FIG. 17B. Logic for to selecting and transitioning individual GTT pages includes initializing a page pointer at 1750. The page pointer may be a register or memory address that is initialized to the top of a NULL-terminated list of asynchronous GTT pages maintained by the mediator. An initial NULL check may be performed at 1754 before traversing the list, where a NULL list causes the mediator to signal completion of the list at 1764. If the list is not NULL, for each element of the list the mediator may select a page in the list of asynchronous GTT pages at 1756, and determine if the page is a candidate to exit asynchronous mode at 1758. In one embodiment, the determination at 1758 is performed by analyzing metadata for the GTT page to determine a frequency of access for the page, or the length of time in which the page has been in asynchronous mode, or the number of VM schedule cycles since the page was last modified. In one embodiment, if the page is frequently or recently accessed, the mediator may determine that the page is not an exit candidate at 1760. The mediator may then select the next page in the list at 1763. Alternatively, if the page is an exit candidate at 1760, the mediator may exit the selected page from the asynchronous mode and remove the page from the list of asynchronous pages at 1762 before selecting the next page in the list at 1763. In one embodiment, when the list is fully traversed the next page in the list selected at 1763 will be NULL. Accordingly, the NULL list determination at 1754 will cause the mediator to signal completion of the list at 1764. The mediator may then complete the transition to synchronous operation for the selected GTT at 1738 in FIG. 17A.

Figure 18:
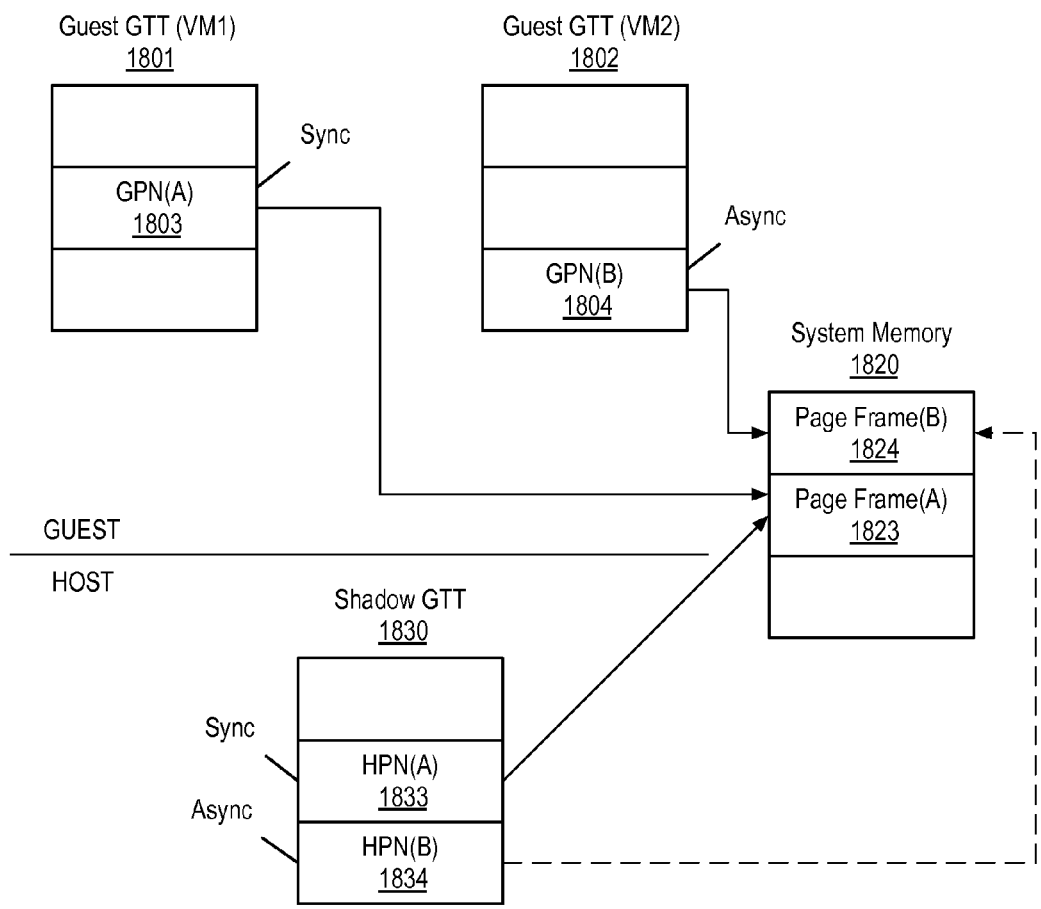
FIG. 18 is a block diagram of illustrating hybrid synchronization, according to an embodiment.

FIG. 18 is a block diagram of illustrating hybrid synchronization, according to an embodiment. In one embodiment, a guest VM mediator using hybrid synchronization manages a portion of a GTT using the synchronous mode and a different portion of the GTT is managed using the asynchronous mode. As illustrated, one embodiment uses a shared shadow GTT 1830 including shadow entries for multiple guest GTTs. While a shared shadow GTT 1830 is shown, in another embodiment a per-VM shadow GTT is used that is similar to the shared shadow GTT 1830.

In one embodiment a first VM guest GTT 1801 includes a set of guest page numbers including GPN(A) 1803 that are continuously synchronized with an associated set of host page numbers including HPN(A) 1833, such that GPN(A) 1803 and HPN(A) 1833 continuously points to the same page frame (e.g., Page Frame (A) 1823) in system memory 1820. In one embodiment the shared shadow GTT 1830 also includes a set of host page numbers including HPN(B) 1834 that are not synchronized (e.g., asynchronous) with their associated guest page numbers in a second VM guest GTT 1802 (including GPN(B) 1804). Accordingly, in one embodiment HPN(B) 1834 and GPN(B) 1804 do not point to the same page frame (e.g., Page Frame (B) 1824) in system memory 1820 until the guest VM (e.g., vGPU rendering engine of the guest VM) commands are submitted to the GPU.

Figure 19:
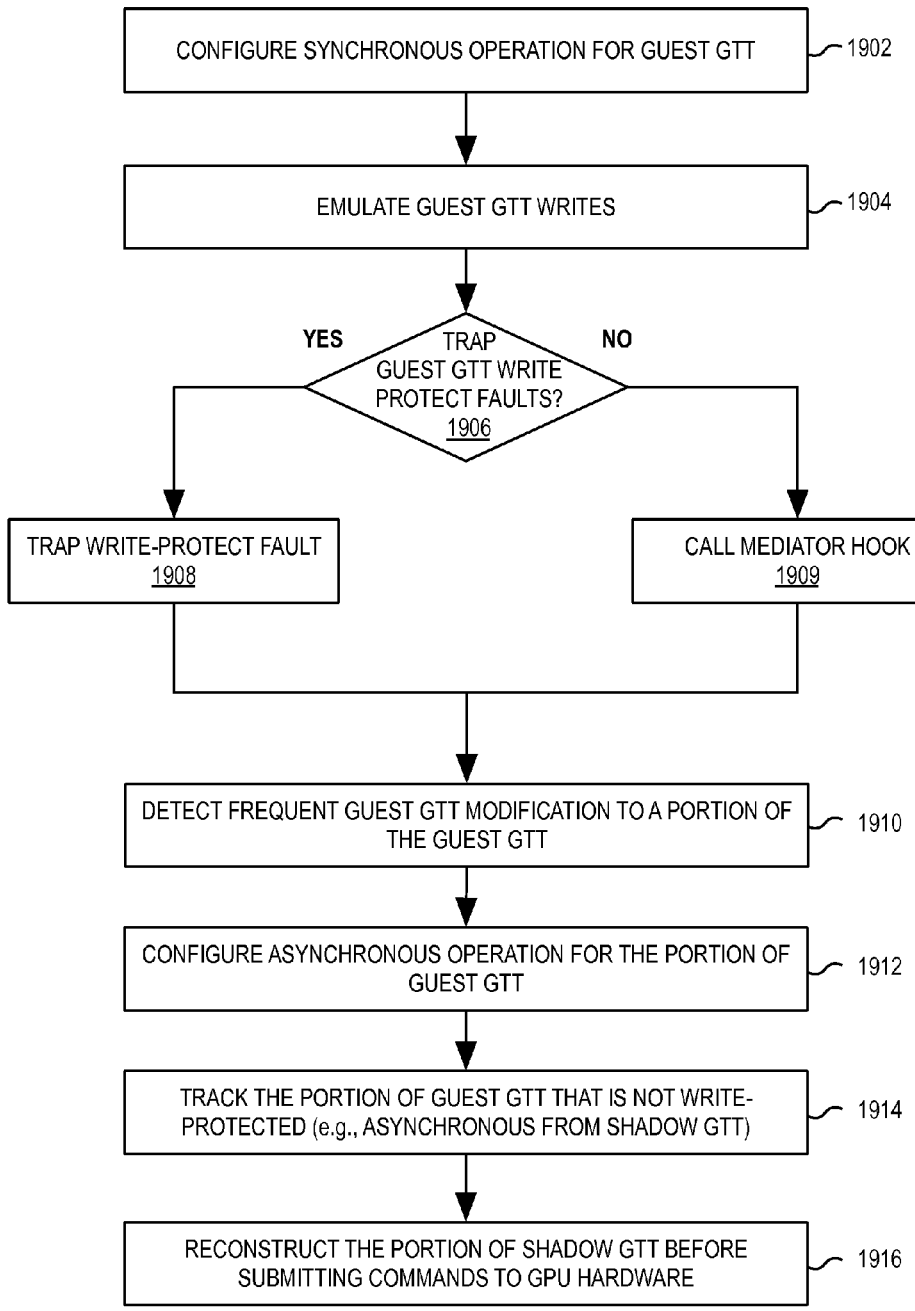
FIG. 19 is a flow diagram of logic to perform hybrid synchronization, according to an embodiment.

FIG. 19 is a flow diagram of logic to perform hybrid synchronization, according to an embodiment. In one embodiment the guest VM mediator configures synchronous operation for a guest global or per-process GTT at 1902. During synchronous operation the mediator emulates guest writes to the GTT, as shown at 1904. In one embodiment, the mediator uses a trap-and-emulate model to emulate guest GTT writes. If the hybrid synchronization logic is configured to selectively trap guest GTT write-protect faults at 1906, in one embodiment the mediator emulates the guest GTT write (for those GTT pages in synchronous mode) during a trap for the write-protect fault causes by the guest write to the GTT. In one embodiment, the mediator may run in host OS in type-one VMM and work together with host graphics driver. The host OS write of GTT is viewed as a guest (such as the service VM in type-two VMM) write of GTT and the mediator is not trapping GTT write-faults of the host graphics driver. Instead, as shown at 1909, one embodiment driver accesses of the GTT is hooked by the mediator, which uses a graphics driver call to the mediator to perform GTT writes for the host OS (and viewed as guest GTT write hereafter). In one embodiment, the trap versus hook configuration is based on the hypervisor used to virtualize the GTT, where the guest GTT writes are trapped at 1908 when a type-one hypervisor is in use, and the mediator hooks are used at 1909 when a type-two hypervisor is in use.

Notwithstanding the mechanism in which guest GTT writes are emulated, if the mediator detects frequent guest GTT modifications to a portion of the guest GTT at 1910, the mediator can configure asynchronous operation for the portion of the guest GTT at 1912, allowing the guest to write to the guest GTT without mediator emulation. In one embodiment, as shown at 1914, the synchronization logic includes registers, cache memory, or data structures in system memory to track the portion of the guest GTT that is not write protected, or is otherwise operating asynchronously from the shadow GTT. As shown at 1916, the synchronization logic reconstructs the relevant portion of the shadow GTT based on the tracked portion of the guest GTT that is asynchronous with the shadow GTT before submitting commands to the GPU hardware.

In one embodiment, the at least a portion of the guest GTT may be allowed to be out of synch with its associated portion of the shadow GTT until hardware commands are submitted. However, the GTT should be properly synchronized before commands are submitted to hardware or execution of the GPU commands may fail. Where the GPU hardware is configured to cache the GTT pages, the GPU hardware may cache the relevant GTT pages in hardware while executing graphics commands.

In one embodiment, as shown in FIG. 15 and FIG. 16 the modified status indicator bits (e.g., dirty bits) of the asynchronous portion of the guest GTT are used to determine the changed elements of the asynchronous portion of the guest GTT. In such embodiment, only those guest GTT elements that have actually changed are used to reconstruct the portion of the shadow GTT, allowing the existing shadow GTT to be used as a basis for construction of the new shadow GTT.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting. Moreover, aspects described in association with one embodiment may be combined with other embodiments described herein.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

It will be understood that multiple types of hypervisors are described herein, including 'hosted' (e.g., type-two) or 'bare metal' (e.g., type-one) hypervisors. The techniques described are not limited to any particular type, form, or model of hypervisor and can be applied to virtual GPUs enabled via type-one, type-two, or any form of hybrid hypervisor.

In embodiments described herein are systems, methods and an apparatus to manage virtual machines. In one embodiment, the apparatus includes a graphics processor coupled to a virtual machine monitor (VMM) to present a virtual graphics processor to a first virtual machine and a mediator for the virtual graphics processor to synchronously shadow modifications to a guest graphics translation table (GTT) of a first virtual machine to a shadow GTT of the VMM. The mediator may also be configured to detect a frequency of modifications to the first guest GTT exceeds a threshold and, in response to the detection, asynchronously shadow at least a portion of the first guest GTT to the shadow GTT. While the mediator may be configured, in one embodiment, to detect a frequency of modifications above a threshold, the mediator may also be configured to detect a number of contiguous modifications above a threshold, or a number of repeated modifications to the same region of the GTT.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor. For example, IP cores, such as the Mali™ family of graphics solutions developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

The development of such IP codes includes the use of simulation software or hardware that may be used to model specific embodiments GPU hardware described herein. Data representing the IP core design may be provided to a fabrication facility where it can be fabricated by a 3$^{rd}$ party to functionality associated with the described embodiments.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An apparatus to manage virtual machines, the apparatus including:
   a graphics processor coupled to a virtual machine monitor (VMM) to present a virtual graphics processor to a first virtual machine; and
   a mediator for the virtual graphics processor to synchronously shadow modifications to a first guest graphics translation table (GTT) of a first virtual machine to a shadow GTT of the VMM, the mediator further to detect a frequency of modifications to at least a first portion of contiguous GTT entries of the first guest GTT exceeds a threshold and, in response to the detection, asynchronously shadow at least a portion of the first guest GTT associated with the first portion to the shadow GTT.

2. The apparatus as in claim 1 wherein the mediator further to asynchronously shadow at least the portion of the first guest GTT before commands for a first virtual graphics processor from the first virtual machine are submitted to the graphics processor.

3. The apparatus of claim 1 wherein the first guest GTT to translate a first graphics memory address for the virtual graphics processor to a system memory address.

4. The apparatus of claim 1 wherein the shadow GTT in the VMM to translate a host graphics memory address to a system memory address.

5. The apparatus of claim 1 wherein the first virtual machine to manage the virtual graphics processor using native graphics driver software.

6. The apparatus of claim 1 wherein the mediator includes a device model for the virtual graphics processor.

7. The apparatus of claim 1 wherein the first guest GTT includes a global GTT and a per-process GTT.

8. The apparatus of claim 7 wherein the per-process GTT includes a page directory table and a page table.

9. The apparatus of claim 1 wherein the VMM further to present a second virtual graphics processor to a second virtual machine.

10. The apparatus of claim 9 wherein the mediator further to synchronously shadow modifications to a second guest graphics translation table (GTT) of a second virtual machine to the shadow GTT of the VMM.

11. The apparatus of claim 10 wherein the mediator further to detect the frequency of modifications to the second guest GTT exceeds a threshold and, in response to the detection, asynchronously shadow the second guest GTT to the shadow GTT before commands for the virtual graphics processor from the second virtual machine are submitted to the graphics processor.

12. A non-transitory machine readable medium storing instructions which, when executed by one or more processors, cause the one or more processors to perform operations including:
   synchronously shadowing a first graphics translation table (GTT) of a first virtual machine to a shadow GTT of a virtual machine monitor (VMM);
   detecting a number of modifications above a threshold to at least a first portion of contiguous GTT entries of the first GTT;
   configuring asynchronous operation for at least the first portion of the first GTT, the configuring including reconstructing at least a portion of the shadow GTT associated with the first portion of the first GTT before submitting graphics commands from the first virtual machine.

13. The medium as in claim 12 wherein synchronously shadowing the first GTT to the shadow GTT includes trapping and emulating each write to the first GTT by the first virtual machine.

14. The medium as in claim 13 wherein trapping and emulating each write to the first GTT includes receiving a write protect trap in response to an attempt to modify the first GTT, modifying the first GTT and shadowing the modification to the shadow GTT.

15. The medium as in claim 12 wherein configuring asynchronous operation for at least the first portion of the first GTT includes removing write protection from at least the first portion of the first GTT.

16. A system for managing virtual machines, the system including:
   one or more processors coupled to a graphics processing apparatus;
   a virtual machine monitor (VMM) to present a virtual graphics processing apparatus to a virtual machine;
   a mediator module to cause the one or more processors to:
      detect a frequency of modifications to at least a first portion of contiguous entries of a graphics translation table (GTT) of the virtual machine exceeds a threshold, wherein the GTT is protected from modification by the virtual machine and the modification of the GTT includes emulation of the modification to the GTT;
      remove the protection from at least a portion of the GTT to allow a modification of the GTT without emulation; and
      construct at least a portion of a shadow GTT based on the first portion of contiguous entries of the modified GTT before commands for the virtual graphics processing apparatus are submitted to the graphics processing apparatus.

17. The system as in claim 16 wherein the mediator module to cause the one or more processors to:
   determine if the virtual graphics processing apparatus is scheduled to submit commands to the graphics processing apparatus; and
   submit commands for the virtual graphics processing apparatus after construction of the shadow GTT.

18. The system as in claim 17 wherein the GTT is a per-process GTT.

19. The system as in claim 18 wherein the GTT is a guest GTT for the virtual graphics processing apparatus.

20. The system as in claim 19 wherein the mediator module to cause the one or more processors to synchronously emulate a modification to a protected portion of the guest GTT, synchronously mirror the modification to the shadow GTT, and asynchronously mirror a modification to an unprotected portion of the guest GTT to the shadow GTT during the construction of the shadow GTT.

* * * * *